United States Patent
Biswas et al.

(10) Patent No.: US 9,419,962 B2
(45) Date of Patent: Aug. 16, 2016

(54) METHOD AND APPARATUS FOR SHARING SERVER RESOURCES USING A LOCAL GROUP

(71) Applicant: Adobe Systems Incorporated, San Jose, CA (US)

(72) Inventors: Sanjeev Kumar Biswas, Bangalore (IN); Dhiraj Sadhwani, Noida (IN); Pradeep Cyril Ekka, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 113 days.

(21) Appl. No.: 14/305,759

(22) Filed: Jun. 16, 2014

(65) Prior Publication Data
US 2015/0365399 A1 Dec. 17, 2015

(51) Int. Cl.
*H04L 29/06* (2006.01)
*G06F 9/00* (2006.01)

(52) U.S. Cl.
CPC .............. *H04L 63/0815* (2013.01); *G06F 9/00* (2013.01)

(58) Field of Classification Search
CPC ............................ H04L 63/0815; H04L 67/10
USPC ............................................... 726/8; 713/172
See application file for complete search history.

(56) References Cited

U.S. PATENT DOCUMENTS

| | | | | |
|---|---|---|---|---|
| 7,818,582 | B2 * | 10/2010 | Marion | G06F 21/335 713/168 |
| 8,473,749 | B1 * | 6/2013 | Madsen | H04L 67/34 713/187 |
| 9,081,951 | B2 * | 7/2015 | Sondhi | H04L 63/0815 |
| 2004/0059590 | A1 * | 3/2004 | Mercredi | H04L 63/0815 726/5 |
| 2012/0291114 | A1 * | 11/2012 | Poliashenko | G06F 21/41 726/8 |
| 2013/0081126 | A1 * | 3/2013 | Soukup | H04L 63/0815 726/8 |
| 2014/0075513 | A1 | 3/2014 | Trammel et al. | |
| 2014/0331273 | A1 * | 11/2014 | Koneru | H04L 63/20 726/1 |
| 2015/0012995 | A1 * | 1/2015 | Korat | H04W 12/06 726/8 |

* cited by examiner

*Primary Examiner* — Samson Lemma
(74) *Attorney, Agent, or Firm* — Keller Jolley Preece

(57) ABSTRACT

A computer implemented method and apparatus for sharing server resources. One or more applications are registered to a first local group on a device, and one or more applications are registered to a second local group on the device. If a user and device have been authenticated, and a device token already acquired for obtaining authorization for a first application of the first local group to access resources from a server, the same device token is available for use in obtaining authorization for a second application of the first group to access (share) resources from the server. Thus, the user need not re-submit authentication credentials to the authorization server. When the user signs out of an application of the same group, the sign out procedure is processed locally for all applications of the group. A device token is surrendered when it is not needed by applications of any other group.

20 Claims, 6 Drawing Sheets

METHOD AND APPARATUS FOR SHARING SERVER RESOURCES USING A LOCAL GROUP

BACKGROUND OF THE INVENTION

1. Field of the Invention

Embodiments of the present invention generally relate to resource access control and, more particularly, to techniques for accessing shared server resources.

2. Description of the Related Art

Authentication techniques generally consist of using authentication credentials to verify an identity of a person or software program. For example, Open ID is an open standard protocol that describes how users can be authenticated in a decentralized (e.g., federated) manner. A decentralized approach to authentication eliminates the need for services to provide their own authentication system. The decentralized authentication approach also allows users to consolidate their digital identities (e.g., by reusing the same authentication credentials for different services). As an example, users create accounts with one or more preferred OpenID identity providers (e.g., Google, Yahoo, Verisign, or others), and then use those accounts as a basis for signing onto any service (e.g., web site or other service) which accepts OpenID authentication. The associated authentication credentials are stored locally on a user's desktop, laptop or mobile computing device. Local storage exposes the credentials to such potential security vulnerabilities as tampering and/or unauthorized use or access.

Authorization, often used together with authentication, generally refers to the process of identifying access rights of a person or software program to certain shared private resources. By way of example, the (Muth protocol (e.g., OAuth Version 2.0) is an open standard protocol for authorization. The OAuth protocol allows users to share their private resources (e.g., photos, videos, contact lists, and/or other private resources) stored on one site with another site. The sharing is achieved without the need to share access credentials. Username and password tokens are supplied instead. The OAuth protocol has become increasingly popular to grant access to clients of services (e.g., web services or web sites). Each token grants access to a specific site (e.g., a video editing site) for specific resources (e.g., just videos from a specific album) and for a defined duration (e.g., the next 2 hours).

Many software applications use server resources on a particular user's behalf during execution of the software applications. In order to control access to server resources and to enforce restrictions placed on such access, each software application on a device is typically required to register with the server using an authentication and authorization process. In a single sign on (SSO) operation, multiple software applications hosted by the same device are simultaneously authorized to use server resources based, at least in part, on the results of a single authentication process. This is particularly desirable where a set of applications require form a suite of complementary functions or require access to a set of resource. As part of such a process, a user furnishes a set of user credentials only once. Typically, the user credentials include a user identifier, such as an e-mail address, and a password, with both of these being unique to a specific user. A shared access token transmitted by an authorization server to the device enables each of the applications to be authorized for access to server resources.

The ability to implement a single sign on process substantially enhances the user experience by avoiding the need to subject a user to an authentication process every time he or she invokes an application. The inventors herein have observed, however, that when a user signs out of one of the applications supported by a single sign on operation, the device token upon which all SSO-supported applications rely is also revoked. That is, the user is signed out of all applications at the same time in a single-sign off operation. This may have a deleterious effect on user's experience, since a user wishing to continue working with some of the applications, but not others, would be forced to sign on again. Therefore there is a need for systems and methods for sharing server resources using local groups wherein the applications thereof receive differential SSO treatment.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for sharing server resources using a local group to enable differential SSO treatment of different local groups is disclosed. One or more software client applications are registered to a first local group at the device, and one or more applications are registered to a second local group at the device. If a user and device have not already been authenticated as part of a request to acquire access to server resources for a particular application registered to a group, then user credentials are sent by the device to a remote server at launch of that application. After a successful authentication process, the server provides a device token to the device. The device token, together with a device identifier uniquely identifying a particular device, and a client identifier uniquely identifying one of the applications registered to a local group, is submitted as part of a request to the server for an access token. A successful authorization process results in the server providing an access token that is used, by the device, to access server resources on behalf of the user and device. If a device token has already been acquired or a prior application registered to the local group as a current application, the authentication is bypassed. When the user signs out of an application of the same group, the sign out procedure is processed locally for all applications of the group. However, a device token is not surrendered until it is not needed by the applications of any other group to which applications are registered at the device.

An apparatus for sharing server resources using a local group comprising: computer having one or more processors configured to execute instructions for registering a first application and a second application to a first local group registry in memory of the computer device; and for registering at least a third application to a second local group registry in memory of the computer device. The at least one process is further operative to launch an application registered to one of the first and second local groups, and to operate a user agent module to automatically retrieve and use a locally stored device token already obtained and used to authenticate an application of a same local group.

A non-transitory computer readable medium for storing computer instructions that, when executed by at least one processor causes the at least one processor to perform a method for sharing server resources using a local group is disclosed. The computer readable medium contains instructions that, when executed by the at least one processor, cause registering of a first application to a local group of applications, wherein each of the applications of the local group requires access to services of a remote server and wherein the registration is performed at the device and is local to the device. The medium further contains instructions for, responsive to launching of the first application, sending user credentials to a remote server to authenticate a user of the device for a plurality of applications on the device requiring server resources, receiving and locally storing, at the device, a device token from the remote server for the user to authenticate the applications of the local group, and using the locally stored device token to authenticate the first application. The medium further contains instructions for, responsive to launching a second application when the second application is registered to the local group, automatically retrieving and using the locally stored device token to authenticate the second application without repeating the sending.

Figure 1:
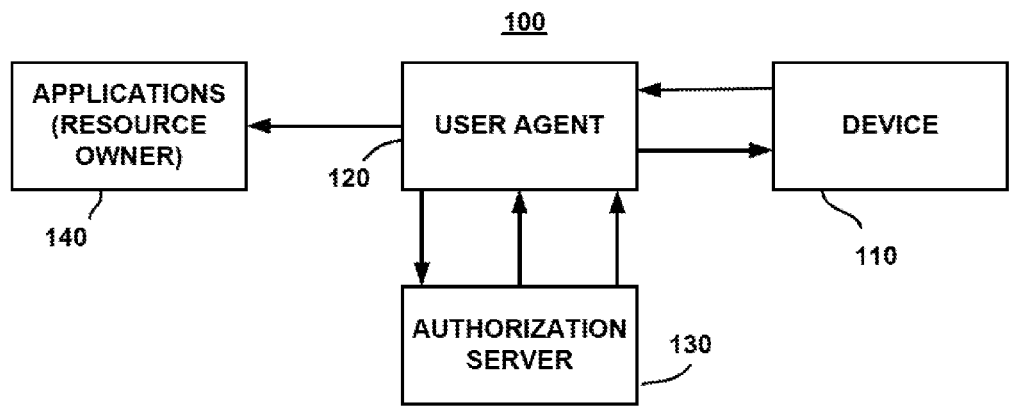
FIG. 1 is a functional block diagram illustrating a device token protocol for authorization and authentication for shared access of server resources across applications using one or more local group, according to one or more embodiments.

While the method and apparatus is described herein by way of example for several embodiments and illustrative drawings, those skilled in the art will recognize that the method and apparatus for sharing server resources using a local group is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for sharing server resources using a local group defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Existing SSO solutions enable sharing of a single device token by all applications on a device. As a result, existing solutions provide single sign-on (SSO) and single sign-off for all applications on a device. When a user logs out of one SSO application, the device token is revoked for all applications. Although a user may wish to log out of just one application on the device, because of the shared device token, the user is logged out of all applications on the device, resulting in a poor user experience.

Thus, and in accordance with embodiments of the present invention, techniques are provided herein that allow for sharing of server resources across multiple client software applications which have been configured, a priori, to join a local group of applications when installed on a particular device. According to one or more embodiments, the software developer distributes client applications configured to invoke a library and API call which causes the applications to register themselves to a particular group when installed on the device. By way of illustrative example, a first application of a suite of products having functions complementary to a second application and to a third application is installed on a device. Each of the three applications have been pre-configured to register themselves to the same local group if, and when, they should ever be installed as client applications on the same device.

When the first application of the complementary suite of products is installed on a device, it registers itself as the first member of a local group. This is done, in some embodiments, by creating a group registry in the local memory of the device. Each client application of a group includes a group registry detection component and a group registry creation component. One or both of these components are executable, as appropriate, at the time of initial installation of the client application. In an embodiment, the group registry detection component determines whether a group registry file, identified by a unique, pre-determined group registry identifier, already exists. If the group registry entry does exist, this signifies that an application belonging to the same local group has already been installed on the device. If, on the other hand, the group registry detection component of the client application determines that the unique registry identifier and an associated list of client identifier(s) is not already present on the device, a call is made to the group registry creation component of the client installer application. The registry creation component adds a new group registry entry and identifies it using the unique group registry identifier associated with a local group. It then adds a unique identifier corresponding to the first application to the thus-created group registry list. In this way, the first application of a first local group to be installed on a device creates, and then joins, the first local group.

When the installer of a second client application is launched, and that second client application belongs to the same local group or complementary suite of applications as the first application, it too invokes the group registry detection component. Since the first application has already been installed, the group registry detection component determines that the applicable group registry identifier and corresponding group registry list is already present. It therefore does not invoke the group registration component but instead updates the applicable, pre-existing group registry list by adding the client identifier of the second application. The client identifiers of the first and the second applications now appear in the same group registry list. As such, the second application is now registered to the same local group as the first application. This process is followed for any subsequent applications of the same suite since they have all been pre-configured to register to the same local group. The process is likewise followed for all subsequent applications, which create, if necessary, and join one or more different local groups if they have been configured to do so.

In order to support differential single sign on and single sign out treatment of applications based upon the particular local group to which they belong, according to embodiments of the disclosure, certain authentication and authorization processes are carried out. As an aid to understanding certain of these processes, definitions for some of the terms used in describing one or more embodiments are provided. In addition to their plain and ordinary dictionary definitions, the following terms should also be understood as follows: a Sign-On Request means a request, sent by a particular User, for authentication of identity. The request can include User Credentials demonstrating that a User is entitled to receive a Device Token allowing one or more applications installed on the device to acquire access to shared server resources;

a User is a person or entity which has acquired a license to acquire, install, and use an instantiation of one or more Software Application Programs;

User Credentials mean, typically, a Unique User Identifier, for example an e-mail address or user name. The user credentials can also include a secure password supplied to an authentication or authorization server to verify the identity of a user submitting a Sign On Request;

a Device Token means a token presented as part of an authorization process and associating a particular User, a particular Device, or both with one another;

a Device means computing system for performing functions for a user by execution of computer programs. Components of a device include a processor, and a memory for storing data, libraries, and Client application programs. Other components include a user interface, and a network interfaces for exchanging information with another devices. Examples of devices include desktop computers, a laptop computers, smartphones, and tablet computers;

a Client Identifier (ClientID) means an identifier that uniquely identifies a software application. In embodiments, a ClientID is one of three criteria used by an authorization server (along with a Device Identifier and a Device Token) to determine whether to grant an Access Token Request;

an Access Token is a token received by a Device from an Authorization Server, in response to an Access Token Request and used to obtain access to shared server resources;

an Access Token Request is a request for an Access Token received by an Authorization Server, and includes a Device Token, a Device Identifier, and the ClientID for which the requesting Device is seeking access to shared server resources;

a Sign-Out Request means a request to discontinue use of shared server resources by one application; and a Local Group of is a plurality of applications which are treated, by maintenance and reference to a local Device registry associating the ClientIDs of a plurality of applications with one another, as a single entity for purposes of Single Sign On and Single Sign Off operation.

Advantageously, the sharing of server resources by local groups according to embodiments of the present disclosure enables different groups of programs to receive differentiated treatment according to the particular group to which it or they are registered. Such differentiated treatment supports single sign on and sign out operation. Moreover, it does so without compromising a software owner's to impose and enforce differentiated terms and restrictions on the distribution and use of its programs. Thus, a user may sign onto one program of a suite of programs, either of which can conveniently constitute or belong to the same or a different local group of applications. Signing onto one application that is part of a suite of application, automatically establishes the user's ability to access resources on behalf of other applications belonging to the same suite. Where the software developer wishes to impose one set of access or use term restrictions to one suite of applications but a different set of policies and restrictions to another, the applications are configured to install to different local groups on a device.

Various embodiments of a method and apparatus for sharing server resources using a local group are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a functional block diagram illustrating a device token protocol for authorization and persistent authentication for shared access of server resources across applications using local groups, according to one or more embodiments. As shown, device 110 communicates with a user agent 120. According to some embodiments, user agent 120 is an application manager, implemented by integration with an application or suite of applications, as a library or an agent that calls a library. The Adobe Identity Management Server (IMS) is an example of a client library that can be called by an application or suite of applications or by a user agent to redirect requests for authentication and authorization using techniques described herein.

In an embodiment, user agent 120 communicates (e.g., via a network, such as the Internet) with an authorization server 130. An example of an authorization server is the Adobe IMS authorization server. The user agent 120 is also in communication with a resource owner 140 (e.g., a server or set of services and/or an application or set of applications, such as an application suite, for example, Adobe® Creative Suite®, Adobe® Creative Cloud®, or another application suite from Adobe or another software vendor).

In some embodiments, a grant type referred to as a device token is used. The device token grant type is similar to the more generic authorization grant type except that while the authorization code is bound to a specific client identifier (ClientID), the device token is bound also to a specific device as well as to a specific user. Thus, this approach can be used to create access tokens for authorized clients on the same device for a plurality of a applications belonging to the same or different groups of applications for differential SSO handling according to embodiments of the disclosure.

Returning to FIG. 1, as shown at 150 and 152, the device 110 initiates the protocol flow by directing a request to the user agent 120 for the resource owner 140 (e.g., a client application that executes locally on the device 110), and the user agent 120 sends the request (e.g., authentication/authorization request) to a device authorization endpoint, which is shown as the Authorization Server 130. In some embodiments, the request that is sent to the authorization server 130 includes various information, including, for example, a device identifier, a client identifier (e.g., for uniquely identifying a client application), a requested scope, geographical information (e.g., local/state information), and a redirection uniform resource identifier (URI) to which the authorization server will send the user agent back once access is granted.

As shown at 154 and 158, the authorization server 130 authenticates the resource owner 140 via the user agent 120. In some embodiments, the user is provided with an option to choose whether or not to persist data on the device in support of accessing shared server resources. If the user elects to persist data on the device, then the authorization server 130 generates a device token for sending to the device 110 via user agent 120. Otherwise, then the authorization server 130 generates a time limited or session restricted device code (e.g., it can only be used for a given session and is not persistently stored on the device), for sending to the device 110 via the user agent 120 (e.g., a user may elect to not persist data on the device if the user is attempting to access a resource from a device that is not their own device, such as from a publicly accessible device).

If the authentication is successful, then at 156, the authorization server 130 redirects the user agent 120 back to the device 110 using the redirection URI provided earlier. In some embodiments, depending on a user input, the redirection URI includes a device token or an authorization code (e.g., and can also include any geography related information previously provided and/or various other information, such as a profile identifier or other information).

At 162, the device 110 requests an access token from the authorization server's token endpoint by authenticating using the client credentials (e.g., device ID) and a device token or an authorization code (e.g., an access token request can include the device token or an authorization code, which can be securely transmitted using a secure protocol and/or the device token (or authorization code) can be encrypted or obfuscated). The authorization server 130 then attempts to validate the client credentials (e.g., device ID) and the device token or the authorization code. If the authorization server 130 successfully validates the request, then the authorization server 130 responds back to the device 110 with an access token as shown at 164. As discussed above, the user's input regarding consent for persisting data on the device determines whether the device token would be used subsequently for authentication instead of the authorization code. In some embodiments, the authorization code is only valid once and cannot be persisted (e.g., the authorization code is on a per-instance or per-session basis).

In some embodiments, each client application is associated with a unique identifier, such as a client identifier (ID) (e.g., client id). For example, this unique identifier can be provided at time of configuration of the application prior to deployment so that the authorization server 130 at run time can uniquely identify the client application with its client ID. In addition to securely transmitting each client's request, each client can be configured with a client secret by the authorization server 130 at a time of registration.

Figure 2:
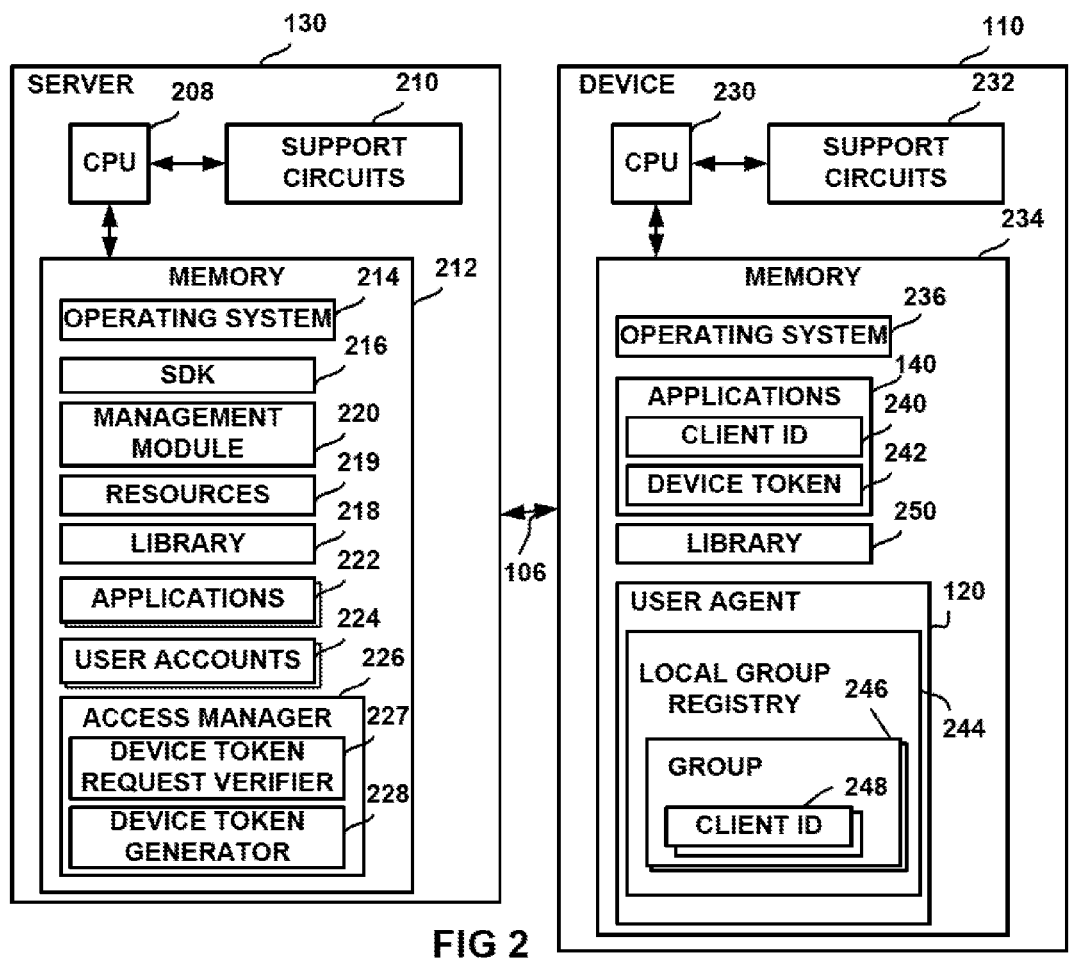
FIG. 2 is another functional block diagram illustrating a system for implementing sharing of server resources using one or more local groups, according to one or more embodiments.

With reference now to FIG. 2, there is shown a functional block diagram of a system 200 for sharing server resources using a local group, according to one or more embodiments. The system 200 includes authorization server 130 and user device 110 (each of which corresponding to their generalized forms shown in FIG. 1). Server 130 and device 110 are communicatively connected via a network connection indicated generally at 106 via user agent 120. The server 130 is a computing device, for example a desktop computer, laptop, tablet computer, and the like. The server 130 includes a Central Processing Unit (CPU) 208, support circuits 210, and a memory 212. The CPU 208 may include one or more commercially available microprocessors or microcontrollers that facilitate data processing and storage. The various support circuits 210 facilitate the operation of the CPU 208 and include one or more clock circuits, power supplies, cache, input/output circuits, and the like. The memory 212 includes at least one of Read Only Memory (ROM), Random Access Memory (RAM), disk drive storage, optical storage, removable storage and/or the like.

The memory 212 includes an operating system 214, a software development kit (SDK) 216, resources 219 to be accessed by device 216 via server 130, a library 218, a management module 220, a plurality of applications 222, and a plurality of user accounts 224. The operating system 214 may include various commercially known operating systems. Authorization server 230 further includes an access manager 226 which includes access token generator 228 for generating a device token after a device token request is verified using a device token request verifier 227.

The user device 210 is a computing device, for example a desktop computer, laptop, tablet computer, and the like. The user device 210 includes a Central Processing Unit (CPU) 130, support circuits 232, and a memory 234. The CPU 230 may include one or more commercially available microprocessors or microcontrollers that facilitate data processing and storage. The various support circuits 232 facilitate the operation of the CPU 230 and include one or more clock circuits, power supplies, cache, input/output circuits, and the like. The memory 234 includes at least one of Read Only Memory (ROM), Random Access Memory (RAM), disk drive storage, optical storage, removable storage and/or the like.

The memory 234 includes an operating system 236, resource owner 140 (FIG. 1) incorporating a plurality of applications, a local group registry 244 and a library 250. The operating system 236 may include various commercially known operating systems. Each of the applications of resource owner 140 includes a ClientID 248 which, as noted earlier is a unique identifier which identifies a specific application. When a user signs onto a first of the applications of a group according to a single sign on process according to one or more embodiments, authentication of the user is performed by the server 130. User credentials are provided by the user to server 130 and, if the authentication server determines there are one or more client applications for which the user requesting authentication is entitled to access shared server resources, a device token 242 is sent to device 110. The device token is stored in memory, on either a persistent, session limited, or time limited basis. The local group registry 244 further includes groups 246. Each group 146 includes one or more ClientIDs 148. Depending on the relationship between applications of one local (e.g., a "first" local group) and one or more applications of another group (e.g., a "second" local group), a token as token 142 can be shared by more than one group. In such event, the token can persist in memory 234 until the user logs out of the last application of the last group requiring device token 242 to access resources provided by (or to which access is mediated by) server 130.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

A software developer uses the SDK 216 to create a plurality of applications 222 and a library 218 that is used by the applications 222 to enable SSO. In some embodiments, these applications are distributed via authorization server 230. That is, one or more applications 222 and library 218 are downloaded to the user device 210. The user device 210 downloads and stores these in memory 234 as applications 140 and library 250. As well, the SDK enables the developer to configure the application to incorporate local group registration code executable by CPU 230 of device 110. This code includes an API (not shown) needed by applications requiring differentiating, local group SSO handling to invoke library 250.

Execution of the local group registration code portion of an application causes the application to register itself to a local group. The local group is locally stored at device 110 and includes one or more applications. As such, library 250 provides the functionality to create the local group registry 244.

A user installs a client software application program 140 on device 110. In one example, the user has installed three client software applications 140 on the user device 210. As an example, the user has installed Adobe PHOTOSHOP, INDESIGN, and ENCORE on device 110. In the present example, PHOTOSHOP and INDESIGN are pre-defined to register themselves to the same local group 246, within local group registry 246, at the time of installation or user configuration. The user launches PHOTOSHOP first. Because no other client application program registered to the same local group as PHOTOSHOP is already executing on device 110, it is first necessary for an initial single sign on procedure to be performed. The user furnishes user credentials in the form, for example, of a username or e-mail address and password. Then, server 130 determines whether this instantiation of PHOTOSHOP, for which access to shared server resources is sought by this particular user, should be granted such access. If so, server 130 sends a device token 242 to device 110 and it is stored in memory. The remainder of the process is automatic and requires no further user participation. PHOTOSHOP sends the device token 242, PHOTOSHOP Client ID, and Device ID to the server and an access token is received.

Due to the association of two applications as PHOTOSHOP and INDESIGN in the same local group 246 within local group registry 244, a subsequent decision by the user of device 110 to launch INDESIGN requires no duplicate entry of access user credentials if the user has already signed on to PHOTOSHOP. Instead, the device token, device identifier, and INDESIGN Client ID are automatically sent back to server 130 and a second access token is received for use by INDESIGN. Specifically, when a user launches the second application of a local group, the application determines whether the user has logged into the server 130 from another application 138 in the same group 146. In the instant example, since the user had not already launched PHOTOSHOP, the user would have been required to sign into the server when INDESIGN was launched. In this case, the need to send user credentials is bypassed and the user is signed on automatically.

The application 140 provides a user interface by which the user may log into the server 130. A user must log into the server 130 so the server 130 can verify that the user is entitled to use of the application 140. The management module 220 tracks which users are logged into each application 222 on the server 130. In some embodiments, the ClientID 240 of the application 140 is stored in the user account 224, although any means of maintaining application login information may be used. Upon successful verification of the user, the management module 220 returns a device token to device 110, which device token is locally stored as device token 242. The application 140 uses the device token 242 to request an access token from the server 130. The access token is needed by the application 140 to access resources on the server 130. In the present example, PHOTOSHOP as an instance of application 138 uses the device token 242 to retrieve an access token.

Due to the face that two applications 140 are in the same group 246, the user is only required to log into the server 130 one time and the user is automatically logged into all other applications 222 that are registered in the same group 246. In addition, one device token 242 is shared among the applications 140 in the group 246. When the user logs out of one of the applications 140 in the group 246, the user is logged out of all applications 138 in the group 246 that the user was previously logged into. As such, sharing the device token 242 with applications 140 registered in the group 246 enables single sign-on and single sign-off on a group level. Even if the applications are not registered in the same group, however, they will still share the same device token, however. The difference in treatment results from locally mapping the ClientIDs not belonging to the same group to a different default UserID.

Figure 3:
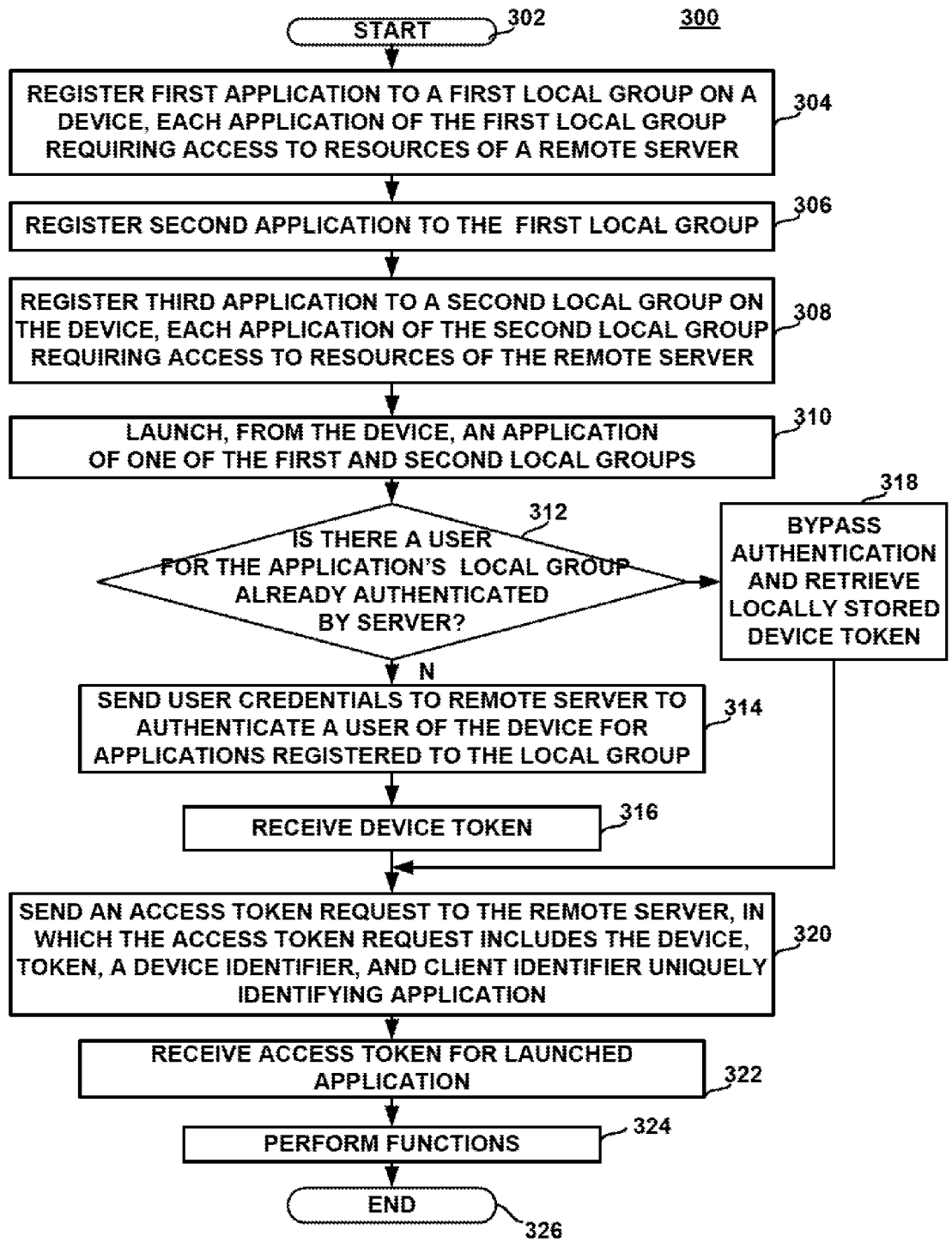
FIG. 3 is a flow diagram depicting a method for implementing sharing of server resources using one or more local groups, according to one or more client side embodiments.

FIG. 3 depicts a flow diagram of a method 300 for sharing server resources using a local group, as performed by the application 140 and the library 250 of FIG. 2, according to one or more embodiments. The method 300 starts at step 302 and proceeds to step 404.

At step 304, the method 300 registers, using a device, a first application to a first local group on the device. Each application of the first local group requires access to the resources of a remote server via the same device. The application is one of a plurality of applications from a software provider. For example, the application is PHOTOSHOP in a plurality of applications that also includes INDESIGN and ENCORE. Each application of the plurality of applications has a unique application identifier, for example, a ClientID. The application is predefined to be in a group of applications that share server resources. The method 300 proceeds to step 306.

At step 306, the method 300 optionally registers a second application with the first local group. At step 308, the method registers a third application with a second local group. Because these the first and second applications are registered to a different local group than the third application, differential SSO treatment according to one or more embodiments are supported.

At step 310, an application is launched from the device by the user. This application is registered to one of the first and second local groups. Responsive to the launch of the application at step 310, the method determines at step 312 whether there is a user for the application's local group already authenticated by the server. If not, user credentials are sent at step 314 from the device to the authentication server. If these credentials are accepted, then the user is authenticated to receive an access token that can be used for gaining access to shared server resources on behalf of applications in at least one of the two groups, and in some embodiments, more than one of the groups. The method receives the access token at the device at step 316.

If at step 312 the method determined that a user for the application's local group had already been authenticated, then the method bypasses the authentication process at step 318 and instead retrieves a locally stored device token acquired during the earlier authentication process. The process proceeds to step 320, where it sends an access token request to the remote server. The access token request includes the device token, a device identifier uniquely identifying the device the user is using, and the client identifier (ID) which uniquely identifies the application to the server. If the request is granted, then the process proceeds to step 322. At step 322, an access token is received for the recently launched application and at step 324, the method performs functions or invoked their performance using shared services accessed from the server. The process terminates at step 326.

Registration of the software applications of a local group according to steps 304, 306 and 308 are generally performed well in advance of the actual authentication and authorization processes exemplified by steps 310 to 326 in FIG. 3. When an application is initially installed, a library is invoked that includes functionality to create and maintain groups. According to some embodiments, method 300 calls an Application Programming Interface (API), for example, registerClientToGroup, which adds the application identifier to the group while performing each of steps 304, 306, and 308. The method 300 calls the API with at least the application identifier and a group identifier, for example, GroupID, for the group to which the application is to be added. For example, the API call may be as follows:

registerClientToGroup(RefinRef, const char* const ClientId, Group groupId);
where inRef is a session object,
ClientId is the unique identifier of the application, and
groupId is the group in which the ClientId is to be a part.

At step 320 and 322, the method 300 automatically signs in the user as part of an SSO process (i.e., without requesting the user enter any user credentials). The method 300 adds the user to the list of users logged into the application. The method 300 proceeds to step 216, where the method 200 receives a shared device token. The device token is retrieved from a local database according to the persistent association that exists between a default UserID associated with the user who is already logged on to one of the applications within a local group, on the one hand, and all of the applications that are registered with that local group, on the other hand. The shared device token is then used by the application to access resources on the server. In some embodiments, the device token is used to retrieve an access token that enables access to resources. The method 200 proceeds to step 218.

As noted earlier, at step 320, the process uses an access token when requesting services from the server. All of the applications within a given group, as defined by at least one mapped association between a user and the one or more applications within the group, use the same device token. The server may also be operative to verify that a particular user is authorized to request access to server resources in connection with the use of a separate grouping of one or more applications comprising another local group. In this case, this latter grouping is likewise associated with the same user by a local mapping of a second default UserID to the ClientID(s) of that application or those applications of the other local group. According to some embodiments, if the user launches an application belonging to a second local group but not to the first local group, the user is prompted to log-in but will, in fact, retrieve an access token on the basis of the locally stored device token already obtained for support of applications of the first local group. Hence, single sign-on is enabled for applications on a group-by-group basis rather than for all applications on device as a whole.

Figure 4A:
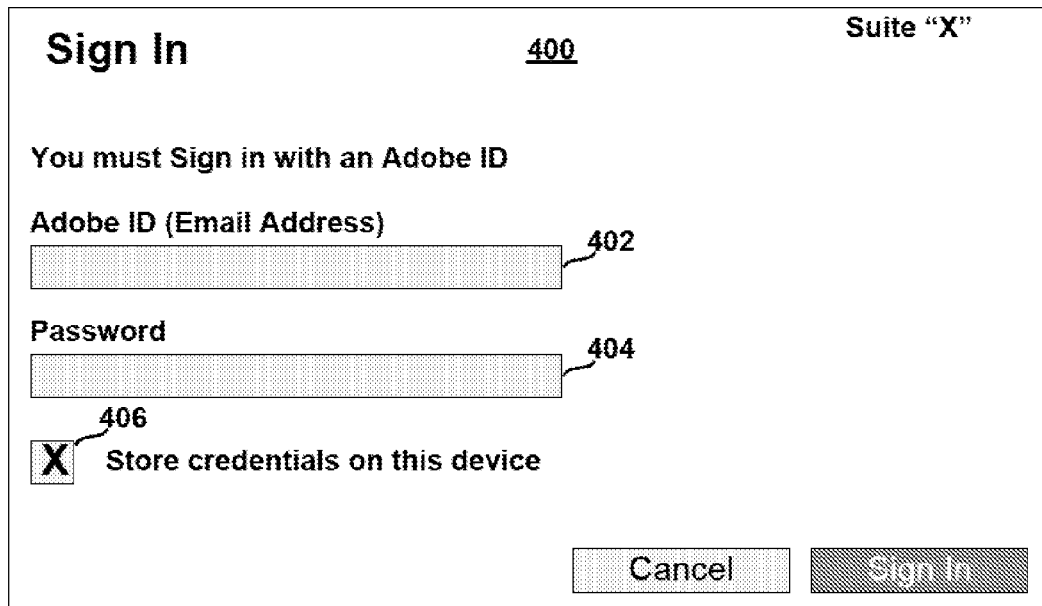
FIG. 4A is a screen shot depicting implementation of a system and method for sharing server resources through single sign-on authentication of an application registered to a first local group of applications at a device, according to one or more embodiments.
Figure 4B:
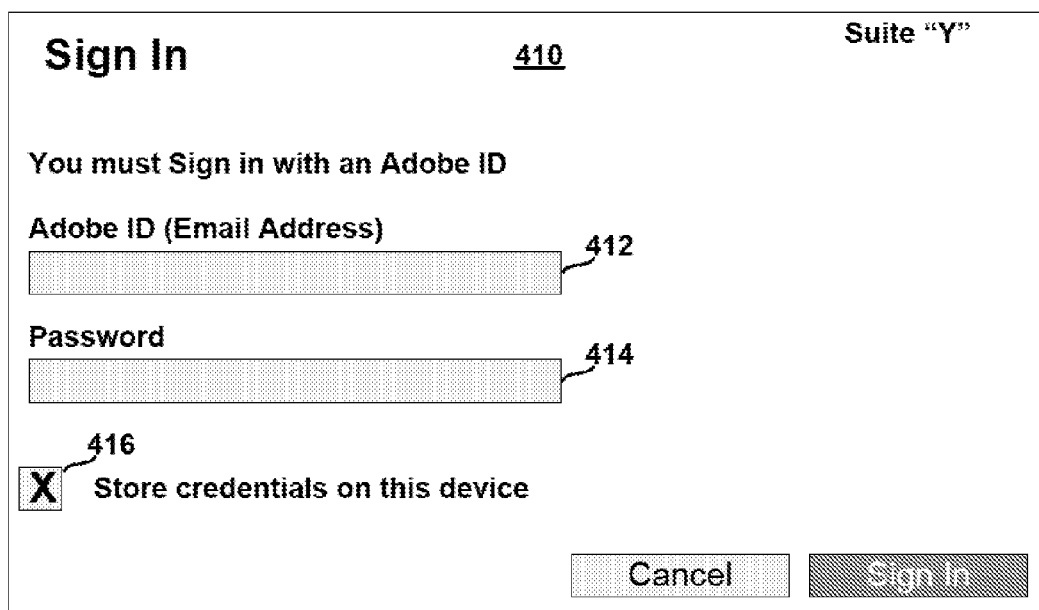
FIG. 4B is a screen shot depicting implementation of a system and method for sharing server resources through single sign on authentication of an application registered to a second local group of applications at a device, according to one or more embodiments.

FIGS. 4A and 4B are screen shots depicting implementation of a system and method for sharing server resources through single sign-on authentication of an application registered to a first local group of applications at a device, according to one or more embodiments.

FIG. 4A is a screen shot 400 depicting implementation of a system and method for sharing server resources through single sign on authentication of an application registered to a second local group of applications at a device, according to one or more embodiments. As seen, a user seeking to launch the first application of suite "X" is required to enter in form field 402 user credentials in the form of an Adobe ID (e.g., an e-mail address) and a password. In form field 404, the user is required to enter a password. To accommodate storage of credentials for SSO operation according to one or more embodiments, a user is given the option of selected (or de-selecting, as the case may be), box 406. The user then clicks on a cancel or sign in tab to advance to submitting a request for a device token, as already described in connection with FIG. 3.

FIG. 4B is a screen shot 410 depicting implementation of a system and method for sharing server resources through single sign on authentication of an application registered to a second local group of applications at a device, according to one or more embodiments. As before, the user seeking to launch a first application of suite "Y" is required to enter in form field 412 user credentials in the form of a unique Adobe ID (e.g., an e-mail address) and a password in box 414. The user may be permitted to use the user credentials as furnished in connection with Suite X from FIG. 4A. The user may also ultimately (i.e., after authentication) be permitted to use the same device token when requesting an access token. However, because the policies and restrictions may be different between the two applications, a separate SSO operation is performed. At box 416, the user seeking to launch an application suite "Y" may be asked for consent to retention of the access and device tokens as already described.

Figure 5:
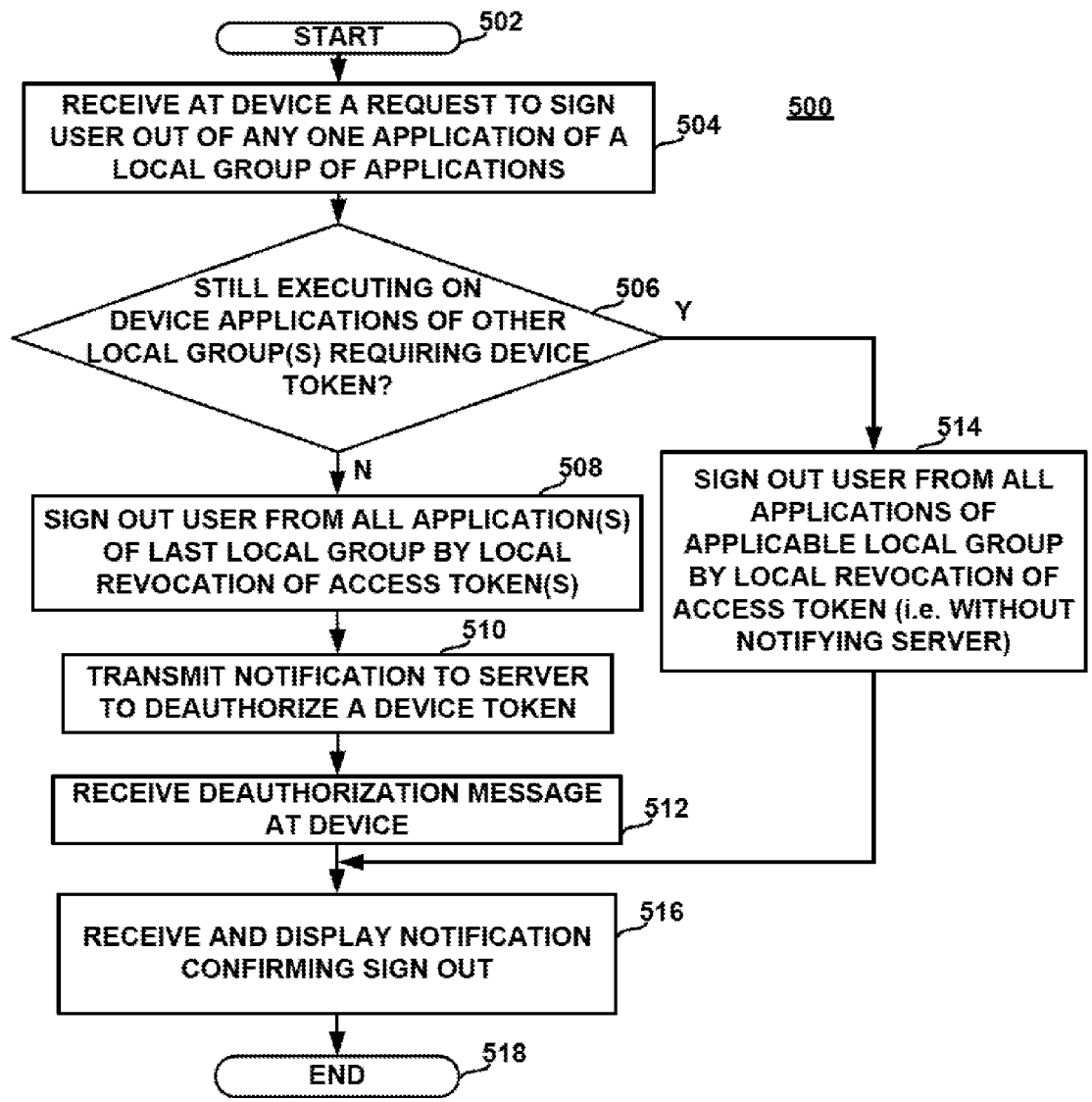
FIG. 5 is a flow diagram depicting the accommodation of single sign out operation while implementing sharing of server resources according to one or more embodiments.

FIG. 5 depicts a flow diagram of a method for shared sign out for a local group, as performed by the application and the library of FIG. 1, according to one or more embodiments. The method 500 starts at step 502 and proceeds to step 504. At step 304, the method 500 receives at a device a request from the user to sign out of any one of the applications of a local group of applications. The request may be received from any application executing on the user device. At step 506, the process determines whether there are still applications executing on the device which require continued availability of a shared device token. If the method determines that the case, the method proceeds to step 514. At step 514, the user is signed out of all applications of the applicable local group by local revocation of the access token. That is the server receives no notification of the sign out process. The process advances to step 516, and the method displays a message to the user confirming completion of the sign out.

If on the other hand, the process determines at step 506 that there are no remaining applications of any other group requiring continued availability of the access token currently being used, then at step 508 the method processes the user sign out request at 508 by revoking the applicable access token(s) and transmits, at step 510, a notification to the server to de-authorize the applicable device token. A confirmation from the server is received at step 512 and at step 516 display of the aforementioned sign out notification to the user is initiated by the method. The process terminates at step 518.

It will thus be appreciated that signing out of a group of one or more applications using a local group, according to embodiments described herein, does not affect any other local group. This process is repeated of signing a user out all applications registered to a local group each time the method 50 receives a request to sign out less than all of the applications associated with a local group. Only when there are no remaining applications requiring a device token is that device token removed from local database storage.

The sign out procedure of method 500 admits of substantial flexibility. In some embodiments, the method 500 calls, for example, a FetchAccounts API. The method 500 identifies which applications from the list, the user is logged into. The method 500 then determines which of the identified applications are in the same group as the application from which the user is logging out. The method 500 logs the user out of the application where the command was received. In addition, the method 500 logs the user out of all of the identified applications that are in the same group as the application from which the user is logging out. For each application, the method 500 removes the user from the list of all users logged into the application.

Figure 6:
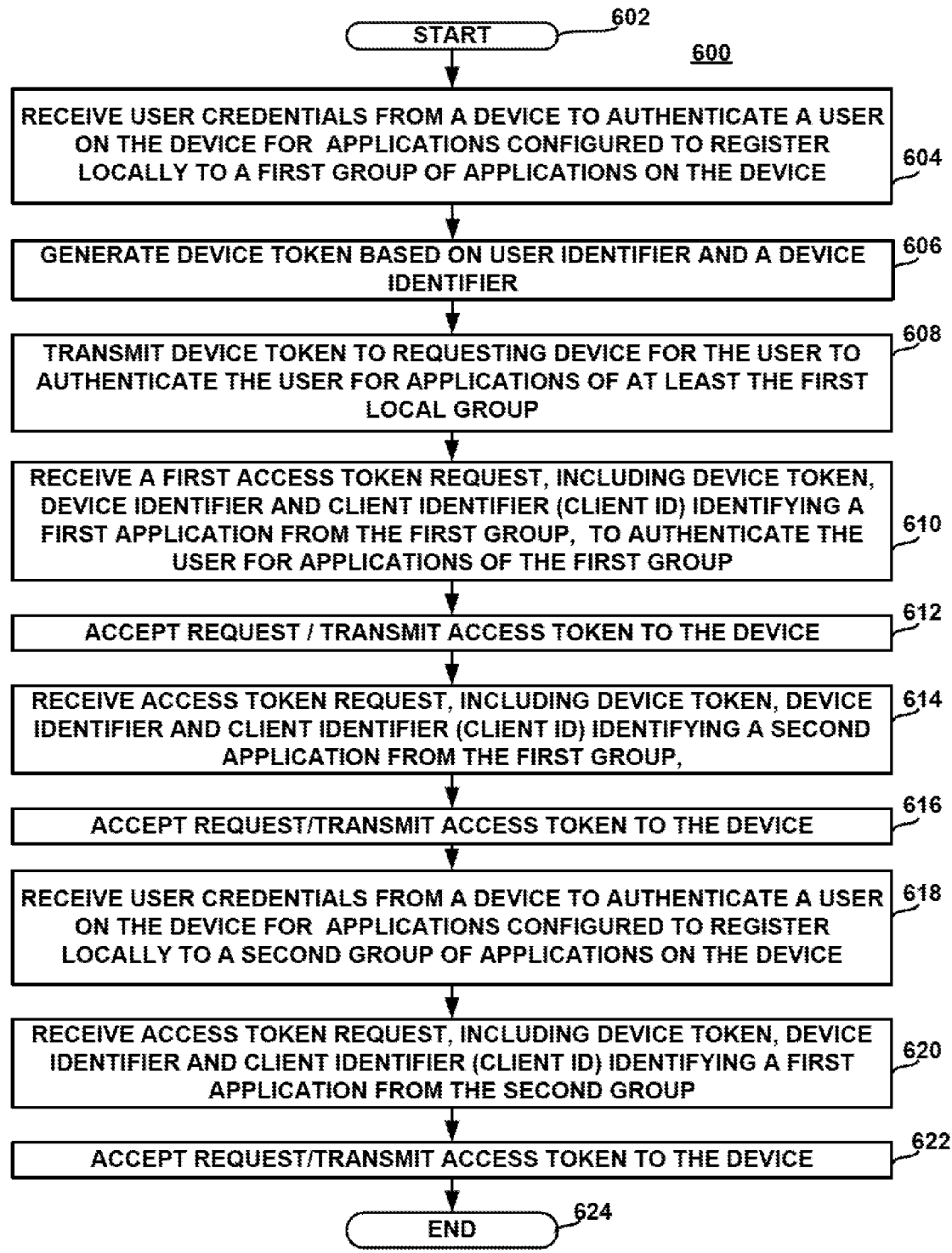
FIG. 6 is a flow diagram depicting a method for implementing sharing of server resources using one or more local groups, through at least some steps supporting single sign on operation implemented at the server side according to one or more embodiments.

FIG. 6 is a flow diagram depicting a method 600 for implementing sharing of server resources using one or more local groups, where at least some steps supporting single sign on operation are implemented at the server side according to one or more embodiments. The process is entered at step 602 and proceeds to step 604. At step 604, the method receives user credentials from a device to authenticate a user of the device for applications configured to register locally to a first group of applications on the device. The method 600 proceeds to step 606.

At step 606, the method generates a token based on a user identifier and device identifier. This association is maintained by storage in memory of the server. At step 608, the method transmits the generated token to the requesting device for the user to authenticate the user for applications of the first group. The method then proceeds to step 610.

At step 610, method 600 receives a first access token request, which includes the received device token, a device identifier, and a client identifier (ClientID). The ClientID, as already noted, identifies the first application from the first local group, to authenticate the user for all applications of the first local group. At step 612, an access token is sent to the requesting device. This is used by the device to access shared server resources on behalf of the first application. At step 614, an access token is requested when a user launches a second application belonging to the first local group of applications. This access token request is not preceded by a separate user authentication phase but instead, due to the association of the first and second applications as part of the same group, the same device token is used twice. At step 616, the method accepts the access token requested in response to launch of the second application. The process advances to step 618.

At step 618, user credentials are received from a device to authenticate a user on the device for one or more applications configured to register locally to a second group on the same device as the first group of applications. In some embodiments, a separate device token is requested from the server on behalf of the second group, an in other embodiments, the same device token is shared across multiple groups of local application groups. Depending on the source of the device token, the user either completes a new authentication process or, as indicated at step 620, an access token is requested based on a locally stored device token, device ID and ClientID. The server accepts the request at 622 and transmits the access token for an application of the second group. The process terminates at step 624.

Figure 7:
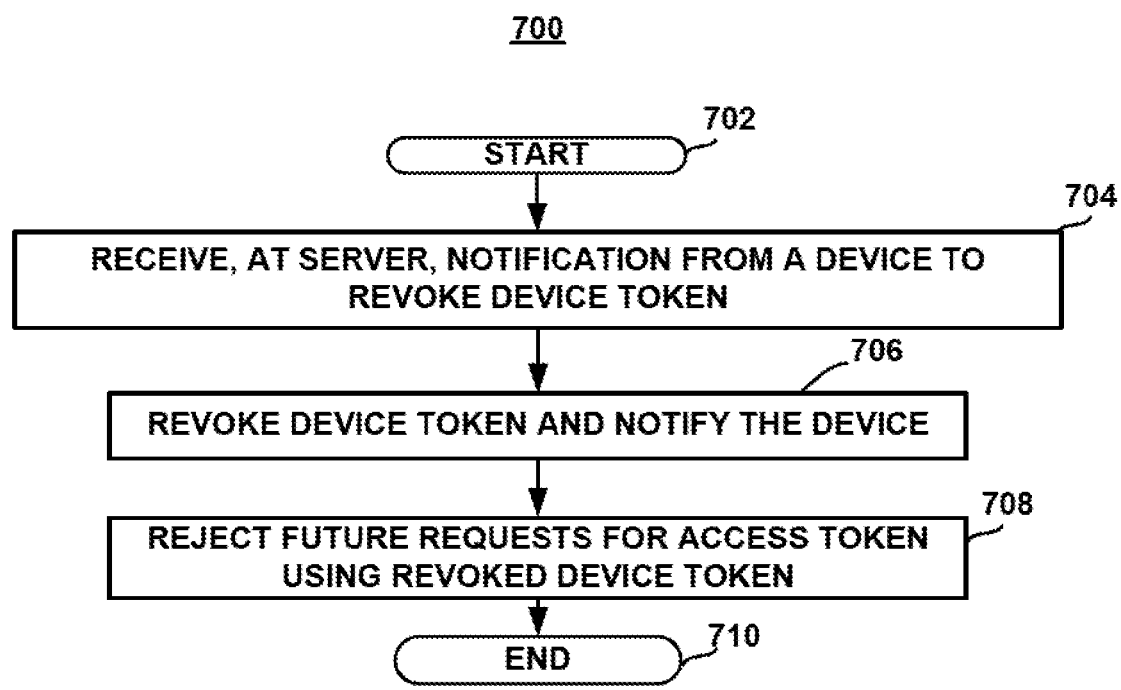
FIG. 7 is a flow diagram depicting a method for implementing sharing of server resources using one or more local groups, through at least some steps supporting single sign out operation implemented at the server side according to one or more embodiments.

FIG. 7 is a flow diagram depicting a method 700 for implementing sharing of server resources using one or more local groups, through at least some steps supporting single sign out operation implemented at the server side according to one or more embodiments. Method 700 is entered at step 702 (start) and proceeds to step 704. At step 704, method 700 receives, at the server, a notification from a device to revoke a device token. The process proceeds to step 706.

At step 706, the method revokes the device token and transmits a notification to the device. At step 708, the method rejects further requests for an access token based on the revoked device token, and instead requires the user to perform a new user authentication process. The process terminates at step 710.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for sharing server resources using at least one local group, comprising:
   registering a first application to a first local group of applications, wherein each of the applications of the first local group requires access to services of a remote server and wherein the registration is performed at the device and is local to the device;
   responsive to launching of the first application from the device, sending user credentials to a remote server to authenticate a user of the device for a plurality of applications on the device requiring server resources;
   receiving and locally storing, at the device, a device token from the remote server for the user to authenticate the applications of the first local group;
   using the locally stored device token to authenticate the first application;
   registering a second application to a second local group at the device, the second application requiring access to services of the remote server and the registration to the second group being local to the device;
   receiving, at the device, a request to sign out of the first application; and
   locally revoking the device token to disable access to resources of the remote server by all applications registered at the device to the first local group but not any application locally registered to the second local group at the device.

2. The method of claim 1, wherein the registering of each application to the first or second local group is performed at installation of the application on the device.

3. The method of claim 2, wherein the registering of each application to the first or second local group comprises invoking, at the device, a library calling an API during installation.

4. The method of claim 1, further comprising continuing to provide access to resources of the remote server to applications registered to the second local group.

5. The method of claim 1, further comprising:
   locally disabling access to resources by all applications registered to the first local group.

6. A computer implemented method for sharing server resources using at least one local group, comprising:
   registering, from a plurality of applications requiring access to services of a remote server, a first subset of applications from the plurality of applications to a first local group registry in memory of the computer device;
   registering, from a plurality of applications requiring access to services of the remote server, a second subset of applications from the plurality of applications to a second local group registry in memory of the computer device;
   responsive to launch of a first application from the first subset of applications registered to the first local group registry, authenticating user credentials and receiving a first device token for automatically authenticating a user associated with the user credentials for any of the applications from the first subset of applications registered to the first local group registry to access the services of the remote server; and
   responsive to launch of a second application from the second subset of applications registered to the second local group registry, authenticating the user credentials and receiving a second device token for automatically authenticating the user associated with the user credentials for any of the applications from the second subset of applications registered to the second local group registry to access the services of the remote server.

7. The method of claim 6, further comprising:
receiving a request to sign out of the first application; and
revoking, at the computer device, the first device token to disable access to resources on the server by all applications belonging to the first local group registry.

8. The method of claim 7, wherein the registering comprises invoking a library from the first application.

9. The method of claim 6, wherein the registering is performed at installation of the first and second applications, respectively.

10. The method of claim 6, wherein the first application and second application co-reside on the computing device, and wherein the first application and second application share resources on the server.

11. The method of claim 10, further comprising:
responsive to launch of another application from the first subset of applications, automatically authenticating the user, wherein automatically authenticating the user comprises:
determining that the user has previously logged into the first application or other application from the first subset of applications; and
responsive to determining that the user has previously logged into the first application or other application from the first subset of applications, retrieving and using the first device token to obtain access to server resources for the another application from the first subset of applications.

12. A non-transitory computer readable medium for storing computer instructions that, when executed by at least one processor causes a computing device to perform a method for sharing server resources using a local group comprising:
registering a first application to a first local group of applications, wherein each of the applications of the first local group requires access to services of a remote server and wherein the registration is performed at the device and is local to the device;
responsive to launching the first application from the device, sending user credentials to a remote server to authenticate a user of the device for a plurality of applications on the device requiring server resources;
receiving and locally storing, at the device, a device token from the remote server for the user to authenticate the applications of the first local group;
using the locally stored device token to authenticate the first application; and
responsive to launching of a second application, when the second application is registered to the local group:
automatically retrieving and using the locally stored device token to authenticate the second application without repeating the sending;
registering a third application to a second local group at the device, the third application requiring access to services of the remote server and the registration to the second local group being local to the device;
receiving, at the device, a request to sign out of one of the first and second applications; and
locally revoking the device token to disable access to resources of the remote server by all applications registered at the device to the first local group but not any application locally registered to the second local group at the device.

13. The computer readable medium of claim 12, wherein the registering of each application to the first local group is performed at installation of the application on the device.

14. The computer readable medium of claim 13, wherein the registering of each application to the first local group comprises invoking, at the device, a library calling an API during installation.

15. The computer readable medium of claim 12, further including continuing to provide access to resources of the remote server to applications registered to the second local group.

16. The method of claim 1, wherein using the locally stored device token to authenticate the first application comprises using the locally stored device token to request and receive an access token from the remote server.

17. The method of claim 16, further comprising:
determining that no application requiring access to services of the remote server is executing on the device; and
in response to determining that no application requiring access to services of the remote server is executing on the device, providing a notification to the remote server that the access token has been revoked.

18. The method of claim 6, wherein registering comprises invoking, at the computer device, a library calling an API during installation of a given application.

19. The method of claim 6, further comprising:
receiving, at the computer device, a request to sign out of the first application; and
signing out the first application and all applications of the first local group but not any applications of the second local group in response to the request to sign out of the first application.

20. The method of claim 19, further comprising revoking the first device token but not the second device token.

* * * * *